United States Patent
Payyavula et al.

(10) Patent No.: US 12,469,596 B2
(45) Date of Patent: Nov. 11, 2025

(54) METHOD AND SYSTEM FOR COORDINATING USER ASSISTANCE

(71) Applicant: Intuitive Surgical Operations, Inc., Sunnyvale, CA (US)

(72) Inventors: Govinda Payyavula, Sunnyvale, CA (US); Simon P. DiMaio, San Carlos, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 255 days.

(21) Appl. No.: 17/780,943

(22) PCT Filed: Nov. 30, 2020

(86) PCT No.: PCT/US2020/062591
§ 371 (c)(1),
(2) Date: May 27, 2022

(87) PCT Pub. No.: WO2021/113175
PCT Pub. Date: Jun. 10, 2021

(65) Prior Publication Data
US 2022/0415492 A1 Dec. 29, 2022

Related U.S. Application Data

(60) Provisional application No. 62/942,696, filed on Dec. 2, 2019.

(51) Int. Cl.
*G16H 40/40* (2018.01)
*G06Q 30/016* (2023.01)

(52) U.S. Cl.
CPC ........... *G16H 40/40* (2018.01); *G06Q 30/016* (2013.01)

(58) Field of Classification Search
CPC ........ G16H 40/40; G16H 40/60; G16H 40/63; G16H 40/67; G06Q 30/016
(Continued)

(56) References Cited

U.S. PATENT DOCUMENTS 8,199,901 B2  6/2012  Rani et al.
8,386,289 B2  2/2013  Vera et al.
(Continued)

FOREIGN PATENT DOCUMENTS

EP  2339524 A1  6/2011
EP  3457675 A1  3/2019
(Continued)

OTHER PUBLICATIONS

Malek Masmoudi, "Decision Support Procedure for Medical Equipment Maintenance Management", Jan. 2016, Journal of Clinical Engineering 41(1):19-29 (Year: 2016).*
(Continued)

*Primary Examiner* — Sangeeta Bahl
*Assistant Examiner* — Joshua D Schneider
(74) *Attorney, Agent, or Firm* — Osha Bergman Watanabe & Burton LLP

(57) ABSTRACT

A coordination system for coordinating remote assistance of a medical system involves a support agent executed by a computer processor. The support agent is configured to receive a first support request submitted by a user of the medical system, and identify a support person to respond to the first support request from a multitude of support persons by applying a support person identification logic to a system-internal context. The system-internal context is obtained from a system awareness engine configured to detect information about the medical system. The support agent is further configured to facilitate contact of the support person.

19 Claims, 8 Drawing Sheets

(58) Field of Classification Search
USPC .......................................................... 705/304
See application file for complete search history.

(56) References Cited

U.S. PATENT DOCUMENTS

| | | | |
|---|---|---|---|
| 11,526,862 B2* | 12/2022 | Liberti | G06Q 20/18 |
| 12,269,163 B1* | 4/2025 | Brubaker | A61B 34/37 |
| 2007/0116231 A1 | 5/2007 | DeGraaff et al. | |
| 2013/0093829 A1* | 4/2013 | Rosenblatt | H04N 7/18 |
| | | | 434/365 |
| 2015/0199488 A1* | 7/2015 | Falchuk | G16H 50/20 |
| | | | 705/2 |
| 2015/0371304 A1 | 12/2015 | Durante et al. | |
| 2017/0282362 A1* | 10/2017 | Erhart | B25J 11/008 |
| 2018/0189748 A1* | 7/2018 | Anderson | G06Q 10/06311 |
| 2019/0090969 A1* | 3/2019 | Jarc | A61B 34/10 |
| 2019/0201136 A1 | 7/2019 | Shelton, IV et al. | |
| 2020/0405408 A1* | 12/2020 | Shelton, IV | A61B 34/30 |
| 2022/0104912 A1* | 4/2022 | Shelton, IV | G16H 40/63 |

FOREIGN PATENT DOCUMENTS

| | | |
|---|---|---|
| WO | 2013049386 A1 | 4/2013 |
| WO | 2016033206 A1 | 3/2016 |

OTHER PUBLICATIONS

International Search Report issued in corresponding international application No. PCT/US2020/062591 mailed Mar. 15, 2021 (4 pages).
Written Opinion of the International Searching Authority issued in corresponding international application No. PCT/US2020/062591 mailed Mar. 15, 2021 (8 pages).

* cited by examiner

METHOD AND SYSTEM FOR COORDINATING USER ASSISTANCE

CROSS REFERENCE TO RELATED APPLICATIONS

This application is a national stage filing under 35 U.S.C. § 371 of International Patent Application Serial No. PCT/US2020/062591, filed Nov. 30, 2020, which claims benefit under 35 U.S.C. § 119(e) to U.S. Provisional Patent Application Ser. No. 62/942,696, filed on Dec. 2, 2019, the disclosures of each of which are incorporated herein by reference in their entirety.

BACKGROUND

Field of Invention

The present invention generally provides improved robotic and/or medical (including surgical) devices, systems, and methods.

OVERVIEW

Robotic systems can be used to perform a task at a worksite. For example, a robotic system may include robotic manipulators to manipulate instruments for performing the task.

Example robotic systems include industrial and recreational robotic systems. Example robotic systems also include medical robotic systems used in procedures for diagnosis, non-surgical treatment, surgical treatment, etc. As a specific example, robotic systems include minimally invasive, robotic telesurgical systems in which a surgeon may operate on a patient from bedside or a remote location. Telesurgery refers generally to surgery performed using surgical systems where the surgeon uses some form of remote control, e.g., a servomechanism, to manipulate surgical instrument movements rather than directly holding and moving the instruments by hand A robotic medical system usable for telesurgery or other telemedical procedures may include a remotely controllable robotic manipulator. Operators may remotely control motion of the remotely controllable robotic manipulator. Operators may also manually move pieces of the robotic medical system into positions or orientations within the robotic medical system's operating environment.

Robotic systems in accordance with one or more embodiments may be complex. For example, a robotic system may include multiple links coupled together by multiple joints. Some or all of these joints may be user-controllable via control algorithms enabling coordinated joint movement. Further, some of these joints may be capable of operating in different modes, depending on task requirements. The robotic system may also be equipped with an instrument. The instrument may have multiple degrees of freedom and different types of instruments may be interchangeably used. The operation of a robotic system with this level of complexity may be non-trivial. In addition, the procedures that are performed with the robotic systems may also be complex and may require careful planning, in particular when using the robotic system to operate on a patient. Providing adequate user support may, thus, be beneficial or even essential.

SUMMARY

In general, in one aspect, one or more embodiments relate to a coordination system for coordinating remote assistance of a medical system, the coordination system comprising: a support agent executed by a computer processor and configured to: receive a first support request submitted by a user of the medical system, identify a support person to respond to the first support request from a plurality of support persons by applying a support person identification logic to a system-internal context, wherein the system-internal context is obtained from a system awareness engine configured to detect information about the medical system, and facilitate contact of the support person.

In general, in one aspect, one or more embodiments relate to a method for operating a coordination system, the method comprising: receiving, by a support agent, a first support request submitted by a user of a medical system; identifying a support person to respond to the first support request from a plurality of support persons by applying a support person identification logic to a system-internal context, wherein the system-internal context is obtained from a system awareness engine configured to detect information about the medical system; and facilitating contact of the support person.

In general, in one aspect, one or more embodiments relate to a non-transitory machine-readable medium comprising a plurality of machine-readable instructions executed by one or more processors associated with a coordination system, the plurality of machine-readable instructions causing the one or more processors to perform a method comprising: receiving, by a support agent, a first support request submitted by a user of a medical system; identifying a support person to respond to the first support request from a plurality of support persons by applying a support person identification logic to a system-internal context, wherein the system-internal context is obtained from a system awareness engine configured to detect information about the medical system; and facilitating contact of the support person.

Other aspects of the invention will be apparent from the following description and the appended claims.

DETAILED DESCRIPTION

Figure 1:
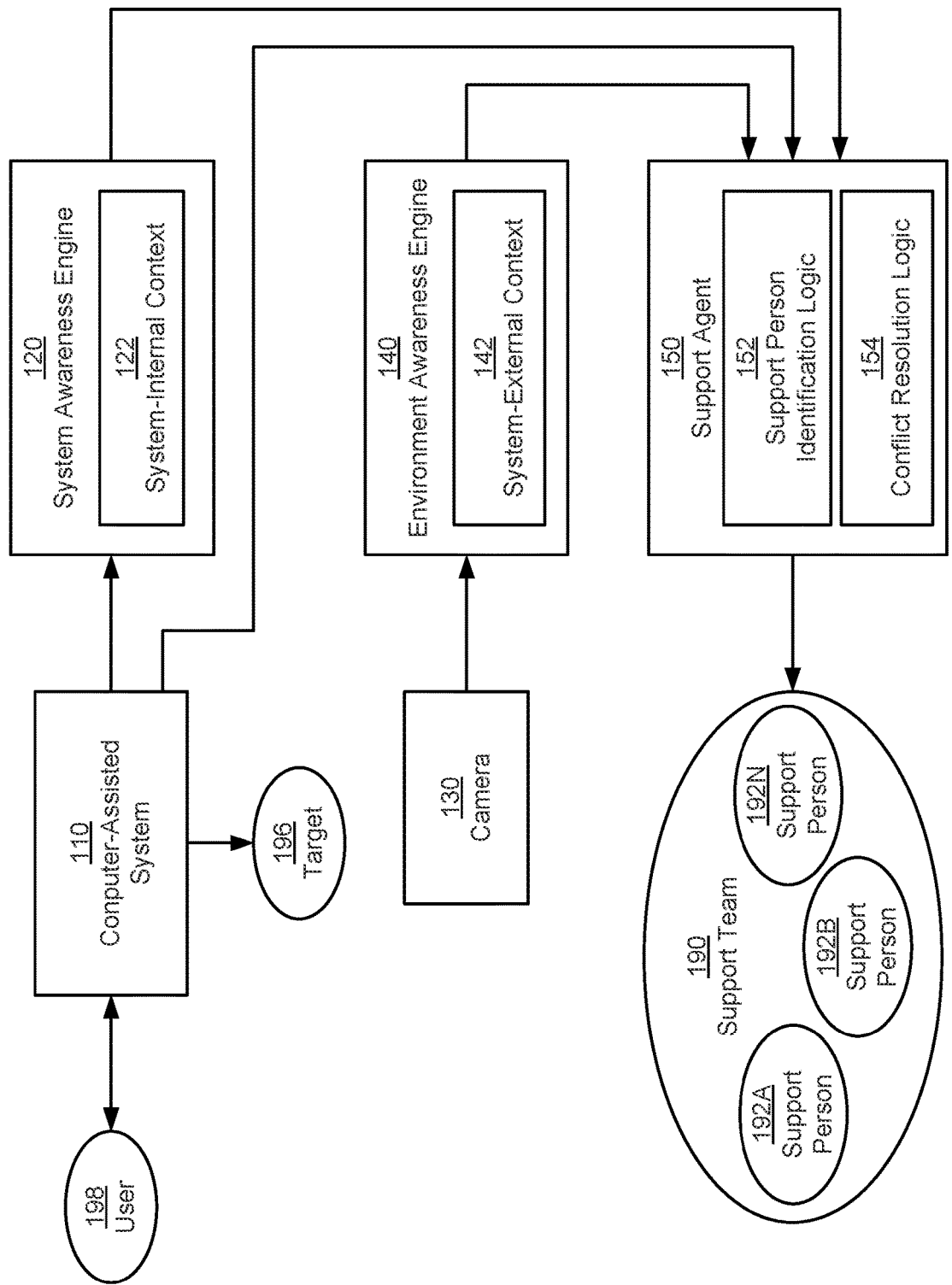
FIG. 1 shows a block diagram of systems for coordinating user assistance, in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Although some of the examples described herein refer to surgical procedures or tools, or medical procedures and medical tools, the techniques disclosed apply to medical and non-medical procedures, and to medical and non-medical tools. For example, the tools, systems, and methods described herein may be used for non-medical purposes including industrial uses, general robotic uses, and sensing or manipulating non-tissue work pieces. Other example applications involve cosmetic improvements, imaging of human or animal anatomy, gathering data from human or animal anatomy, setting up or taking down the system, and training medical or non-medical personnel. Additional example applications include use for procedures on tissue removed from human or animal anatomies (without return to a human or animal anatomy), and performing procedures on human or animal cadavers. Further, these techniques can also be used for medical treatment or diagnosis procedures that do, or do not, include surgical aspects.

In general, embodiments of the disclosure may coordinate remote assistance to support users of robotic and/or medical systems, in accordance with one or more embodiments. The coordination of remote assistance may involve, for example, identifying a suitable support person from multiple potentially available support persons, and providing useful information to the identified support person. The coordination may further involve scheduling a response to the support request, in particular when there are multiple competing support requests.

In one or more embodiments, the coordination of the remote assistance considers a context associated with the support request. Contextual information may be gathered from the robotic or medical system itself (system-internal context) and/or be gathered from observing the operating environment in which the system operates (system-external context). Contextual information may be used in order to efficiently obtain support for a user issuing a support request. In one or more embodiments, the robotic or medical system includes numerous components, the state of which may be detected and used to determine an operational state of the system. For example, system-internal context such as the status of a robot manipulator of the system or the status of instruments that are or may potentially be attached instruments, may be detected using one or more sensors. As further examples of system-internal contexts that may be detected include whether a portion of the system has been draped, whether (in a medical example) a cannula for guiding a medical instrument is connected to the medical system, whether and which errors or faults have been detected in the operation of the system, etc. Such information obtained from the detecting may subsequently be used as system-internal contextual information. Examples of system-external contextual information include that obtained by a computerized vision system of the operating environment external to the system. For example, image data of the workspace may be used to identify the current stage of a procedure being performed using the medical or robotic system.

In combination, the contextual information obtained from the robotic or medical system may be used for various purposes. Example purposes include, and are not limited to: identifying a suitable support person to be contacted when a user of the system issues a support request, identifying the priority of the support request, and compiling information to be provided to the support person. These and additional features and their implementation are discussed in the following description.

Referring now to the drawings, in which like reference numerals represent like parts throughout the several views, FIG. 1 schematically shows a block diagram of systems that interact for coordinating remote assistance of a computer-assisted system (110), in accordance with one or more embodiments. During operation, a computer-assisted system (110) interacts with a target (196) in an operating environment), and is being operated by a user (198). The computer-assisted system (110) may comprise a computer-assisted medical system such as a computer-assisted diagnostic system or a computer-assisted surgical system. The coordination system that coordinates remote assistance for the computer-assisted system (110) may include a support agent (150), and may further include a system awareness engine (120) and/or an environment awareness engine. Support persons (192A-192N) of a support team may be contacted to support the user (198). Each of these elements is subsequently described.

In one or more medical embodiments, the computer-assisted system (110) is a medical system as described below with reference to FIG. 2A, FIG. 2B, and FIG. 3, or any other type of medial system. Alternatively, in other medical embodiments the computer-assisted system (110) is a non-surgical medical system (such as a non-invasive, diagnostic system). Further, as another example, the computer-assisted system (110) may be a non-medical system (such as an industrial robot).

In a medical example, the user (198) of the computer-assisted system (110) may be a healthcare professional operating the computer-assisted system (110). For a computer-assisted system (110) comprising a surgical system, the healthcare professional may be a surgeon or surgical assistant.

In a medical embodiment, the target can be an excised part of human or animal anatomy, a cadaver, a human, an animal, or the like. FIG. 1 shows as an example a target (196) that is a patient receiving medical tests or treatment through a procedure performed by the computer-assisted system (110).

In one or more embodiments, the system awareness engine (120) is software, hardware, and/or a combination of software and hardware configured to determine a system-internal context (122). The system awareness engine (120) includes a set of machine-readable instructions (stored on a computer-readable medium) which, when executed by a computing device, perform one or more of the operations described in the flowcharts of FIG. 4A. The system awareness engine (120) may be implemented on a computing device of the computer-assisted system (110), such as the computing system described below with reference to FIG. 2B. The computer-assisted system may be a medical system. Broadly speaking, the system awareness engine (120) obtains parameters of the computer-assisted system (110). These parameters may include any information that provides insight into the current operational state of the computer-assisted system (110). For example, numerous parameters of a robotic manipulation system (as described below with reference to FIG. 2A, FIG. 2B, and FIG. 3), such as joint positions or velocities, type of tools or instruments, states of tools or instruments, control modes, etc., may be collected. Other parameters that may be collected include hardware serial numbers, firmware versions, installed hardware and/or software modules, error logs, etc. The gathered parameters may be compiled to form the system-internal context (122), discussed in more detail below with reference to FIG. 4A.

In one or more embodiments, the camera (130) is configured to capture images or sequences of images (videos) of the computer-assisted system (110) and/or the operating environment external to the computer-assisted system, such as a space surrounding or near the computer-assisted system. The camera (130) may, thus, provide image data suitable for determining a system-external context (i.e., of context that cannot necessarily be obtained directly from data about the computer-assisted system (110) itself). The computer-assisted system may be a medical system. For example, image data may be used to detect a state of the target (e.g. for an example with target (196) that is a patient: if the patient is present, what the state of the patient is (patient prepped and/or under anesthesia, etc.)). The camera (130) may capture two-dimensional or three-dimensional image data. The camera may be mounted either on a component of the computer-assisted system (110), or on a wall, a ceiling, etc. Alternatively, the camera may be part of an augmented or mixed reality system worn by the user (198). Head tracking may be integrated to enable registration of the captured image data with the computer-assisted system (110) and/or the operating environment of the computer-assisted system. As an alternative, or in addition to, the camera (130), other types of operating environment sensors may be used. For example, one or more motion sensors, laser scanners, ultrasound scanners, etc. may be used. Sensors that are integrated with other equipment may also be used. For example, a sensor may be integrated into an operating table to detect presence or absence of the patient, one or more sensors may be integrated into an anesthesia cart to allow monitoring the state of anesthesia, etc.

The environment awareness engine (140) is software, hardware, and/or a combination of software and hardware configured to determine a system-external context (142). The environment awareness engine (140) includes a set of machine-readable instructions (stored on a computer-readable medium) which, when executed by a computing device, perform one or more of the operations described in the flowchart of FIG. 4B. The environment awareness engine (140) may be implemented on a computing device of the computer-assisted system (110), such as the computing system described below with reference to FIG. 2B. Broadly speaking, the environment awareness engine (140) processes the image data obtained from the camera (130) to extract additional information, beyond the system parameters of the computer-assisted system (110). For example, the environment awareness engine (140) may detect the location of the computer-assisted system (110) relative to the target (196). In the medical example of, the environment awareness engine (140) may detect whether a target (196) is already present for an upcoming operation, whether a component of the computer-assisted system (110) is inside or outside a sterile area, etc. Other examples of system-external contexts derived by the environment awareness engine (140), such as by using digital image processing of the image data provided by the camera (130), are described below with reference to the flowchart of FIG. 4B. The information gathered by the environment awareness engine (140) may be used as system-external context (142).

The support agent (150) is software, hardware, and/or a combination of software and hardware configured to process the system-internal context (122) and/or system-external context (142) in order to coordinate remote assistance in response to a support request received from the user (198). The support agent (150) includes a set of machine-readable instructions (stored on a computer-readable medium) which, when executed by a computing device, perform one or more of the operations described in the flowchart of FIG. 5. The support agent (150) may be implemented on a computing device of the computer-assisted system (110), such as the computing system described below with reference to FIG. 2B. Alternatively, in one embodiment, the support agent (150) is hosted in a cloud environment. Accordingly, a data network (not shown) may establish a connection between the system awareness engine (120), the environment awareness engine (140), and the support agent (150).

In one embodiment, the support agent (150) includes a support person identification logic (152). The support person identification logic (152) may use the system-internal context (122) and/or the system-external context (142) to identify a suitable support person among the support persons (192A-192N) of the support team, based on known characteristics of the support persons, in order to respond to a support request. A description of the support person identification logic (152) is provided below with reference to the flowcharts. Further, examples of the logic are provided in FIGS. 6A and 6B.

In one embodiment, the support agent (150) includes a conflict resolution logic (154). The conflict resolution logic (154) may use the system-internal context (122) and/or the system-external context (142), and a known availability of support persons (192A-192N) to prioritize support when multiple competing support requests are received. A description of the conflict resolution logic (154) is provided below with reference to the flowcharts.

The support team (190) may include multiple support persons (192A-192N). The support persons may have similar or different characteristics that are known. More specifically, different support persons may be familiar with different aspects of the computer-assisted system (110), different aspects or stages of the procedure being performed by the computer-assisted system (110), etc. Some support persons may be local whereas other support persons may be remote. Support persons may also have different levels or types of training, experience, and/or expertise. Some support persons may be specialized in one or more particular aspects of the computer-assisted system (110) or procedure for computer-assisted system (110), whereas other support persons may be generalists. Some support persons may have particular clearances or qualifications that qualify them to provide better support on issues than other support persons. For example, some support persons may have received specialized training and/or certifications. Further, accessing some support persons may be costlier than others.

In one embodiment, assume that the support team (190) includes support persons (192A-192N) who are specialized in providing support for a robotic medical system comprising a computer-assisted system (110). (Example robotic medical systems are subsequently discussed with reference to FIG. 2A, FIG. 2B, and FIG. 3). The support team may include personnel such as: field personnel, technicians and engineers, robotics coordinators, field supervisors, and remote experts for the procedure being performed. For convenience, the system is referred to as a medical system in the discussion below, and the same concepts can be applied to non-medical computer-assisted systems (110).

A robotics coordinator (not shown) may be located at the site of the medical system and be an employee of the institution possessing the medical system. The robotics coordinator may be trained in the basics of the medical system, and help coordinate the use of the medical system.

A field technician (not shown) may be near the site of the medical system and potentially locally available at the site of the medical system. For example, the field technician may be an employee of a hospital. As another example, the field technician may not be immediately local, but close enough to arrive at the site within hours or days. The field technician may have limited general training and knowledge, and may be able to assist with common, basic technical support problems. The field technician may have received training by the manufacturer of the medical system.

A field supervisor (not shown) may be able to assist with technical problems that are beyond the knowledge of a typical field technician. A field supervisor may be able to be on-site within a reasonable time frame once support is requested, be on-call to provide remote support to the field technician or other field personnel, etc. A field supervisor may have received training by the manufacturer of the medical system.

A remote expert (not shown) may be able to assist with challenges of various types. For example, a remote technical expert may be able to assist with challenging technical problems with the medical system. A remote medical expert may be able to assist with challenges with a medical procedure, such as the complex workflows or other complexities of ongoing surgery. Different types of remote technical experts may be available. For example, some remote experts may assist with broad system-level knowledge, whereas other remote experts may assist with highly specific problem, for example problems related to a particular tool, a particular procedure being performed with the medical system, etc.

Figure 2A:
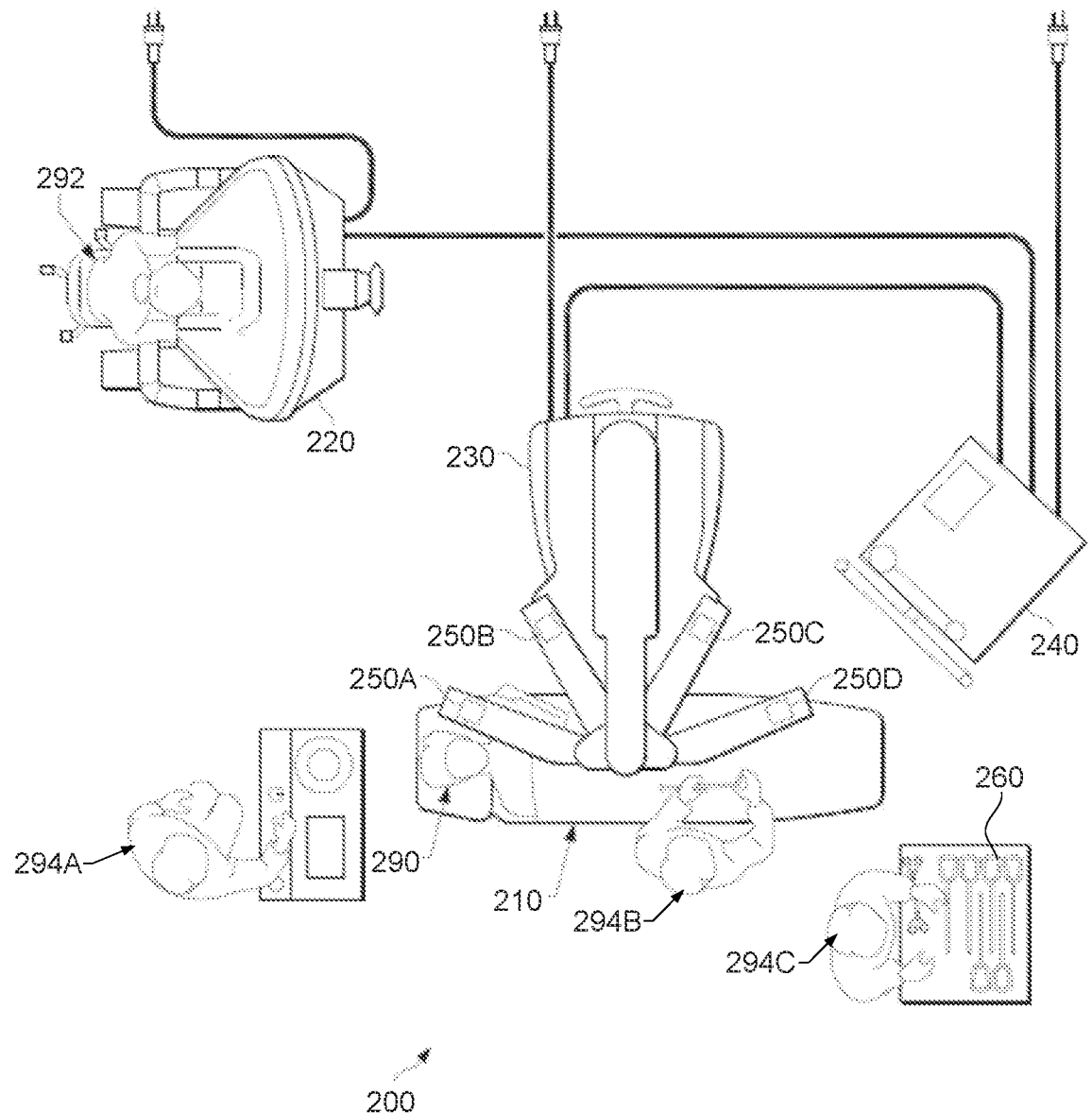
FIG. 2A shows an overhead view of a computer-assisted medical system in a robotic procedure scenario, in accordance with one or more embodiments.

FIG. 2A shows an overhead view of a computer-assisted system comprising a computer-assisted medical system (200), in a robotic procedure scenario. While in FIG. 2A, a minimally invasive robotic surgical system is shown as the computer-assisted medical system (200), the following description is applicable to other scenarios and systems, e.g., non-surgical scenarios or systems, non-medical scenarios or computer-assisted systems, etc.

In the example, a diagnostic or surgical procedure is performed on a patient (290) who is lying down on an operating table (210). The system may include a user control system (220) for use by an operator (292) (e.g., a clinician such as a surgeon) during the procedure. One or more assistants (294A, 294B, 294C) may also participate in the procedure. The computer-assisted medical system (200) may further include a robotic manipulating system (230) (e.g., a patient-side robotic device) and an auxiliary system (240). The robotic manipulating system (230) may include at least one manipulator arm (250A, 250B, 250C, 250D), each of which may support a removably coupled tool (260) (also called instrument (260)). In the illustrated procedure, the tool (260) may enter the body of the patient (290) through a natural orifice such as the throat or anus, or through an incision, while the operator (292) views the worksite (e.g., a surgical site in the surgical scenario) through the user control system (220). An image of the worksite may be obtained by an imaging device (e.g., an endoscope, an optical camera, or an ultrasonic probe), i.e., a tool (260) used for imaging the worksite, which may be manipulated by the robotic manipulating system (230) so as to position and orient the imaging device. The auxiliary system (240) may be used to process the images of the worksite for display to the operator (292) through the user control system (220) or other display systems located locally or remotely from the procedure. The number of tools (260) used at one time generally depends on the task and space constraints, among other factors. If it is appropriate to change, clean, inspect, or reload one or more of the tools (260) being used during a procedure, an assistant (294A, 294B, 294C) may remove the tool (260) from the manipulator arm (250A, 250B, 250C, 250D), and replace it with the same tool (260) or another tool (260).

Figure 2B:
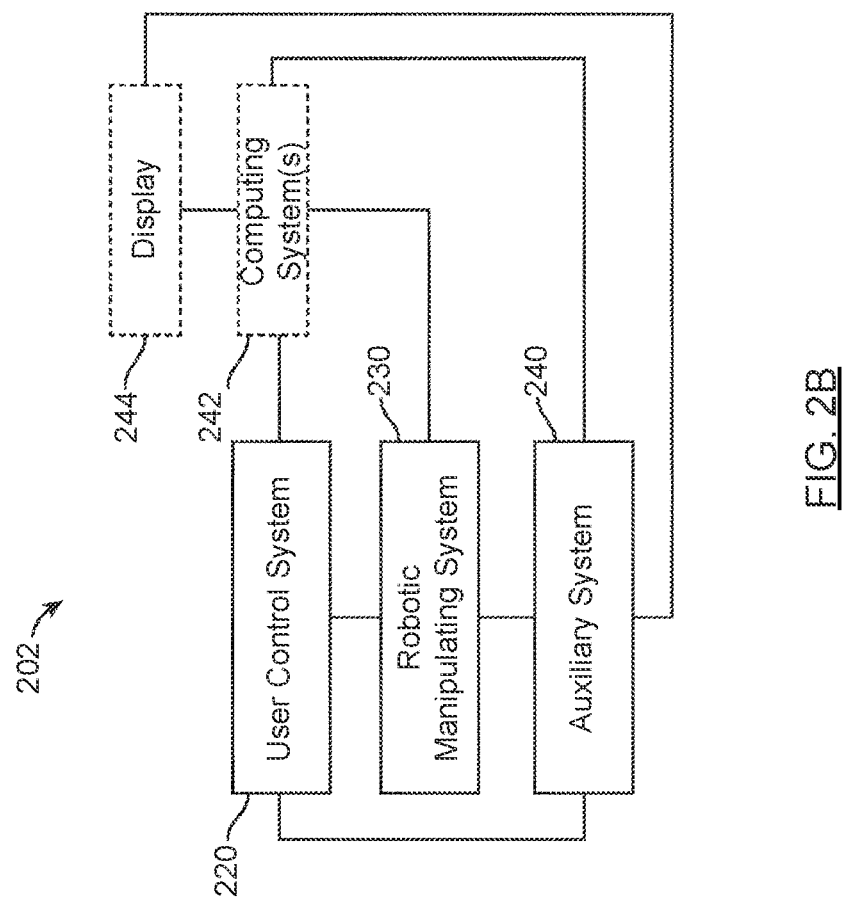
FIG. 2B diagrammatically shows various components of the robotic procedure scenario of FIG. 2A, in accordance with one or more embodiments.

FIG. 2B provides a diagrammatic view (202) of the computer-assisted medical system (200). The computer-assisted medical system (200) may include one or more computing systems (242). A computing system may be used to process input provided by the user control system (220) from an operator. A computing system may further be used to provide an output, e.g., a video image to the display (244). One or more computing systems (242) may further be used to control the robotic manipulating system (230).

A computing system (242) may include one or more computer processors, non-persistent storage (e.g., volatile memory, such as random access memory (RAM), cache memory), persistent storage (e.g., a hard disk, an optical drive such as a compact disk (CD) drive or digital versatile disk (DVD) drive, a flash memory, etc.), a communication interface (e.g., Bluetooth interface, infrared interface, network interface, optical interface, etc.), and numerous other elements and functionalities.

A computer processor of a computing system (242) may be an integrated circuit for processing instructions. For example, the computer processor may be one or more cores or micro-cores of a processor. The computing system (242) may also include one or more input devices, such as a touchscreen, keyboard, mouse, microphone, touchpad, electronic pen, or any other type of input device.

A communication interface of a computing system (242) may include an integrated circuit for connecting the computing system (242) to a network (not shown) (e.g., a local area network (LAN), a wide area network (WAN) such as the Internet, mobile network, or any other type of network) and/or to another device, such as another computing system (242).

Further, the computing system (242) may include one or more output devices, such as a display device (e.g., a liquid crystal display (LCD), a plasma display, touchscreen, organic LED display (OLED), projector, or other display device), a printer, a speaker, external storage, or any other output device. One or more of the output devices may be the same or different from the input device(s). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

A computing system (242) may be connected to or be a part of a network. The network may include multiple nodes. Each node may correspond to a computing system, or a group of nodes. By way of an example, embodiments of the disclosure may be implemented on a node of a distributed system that is connected to other nodes. By way of another example, embodiments of the invention may be implemented on a distributed computing system having multiple nodes, where each portion of the disclosure may be located on a different node within the distributed computing system. Further, one or more elements of the aforementioned computing system may be located at a remote location and connected to the other elements over a network.

The robotic manipulating system (230) may use a tool (260) comprising an imaging device, e.g., an endoscope or an ultrasonic probe, to capture images of the worksite and output the captured images to an auxiliary system (240). The auxiliary system (240) may process the captured images in a variety of ways prior to any subsequent display. For example, the auxiliary system (240) may overlay the captured images with a virtual control interface prior to displaying the combined images to the operator via the user control system (220). The robotic manipulating system (230) may output the captured images for processing outside the auxiliary system (240). One or more separate displays (244) may also be coupled with a computing system (242) and/or the auxiliary system (240) for local and/or remote display of images, such as images of the procedure site, or other related images.

Figure 3:
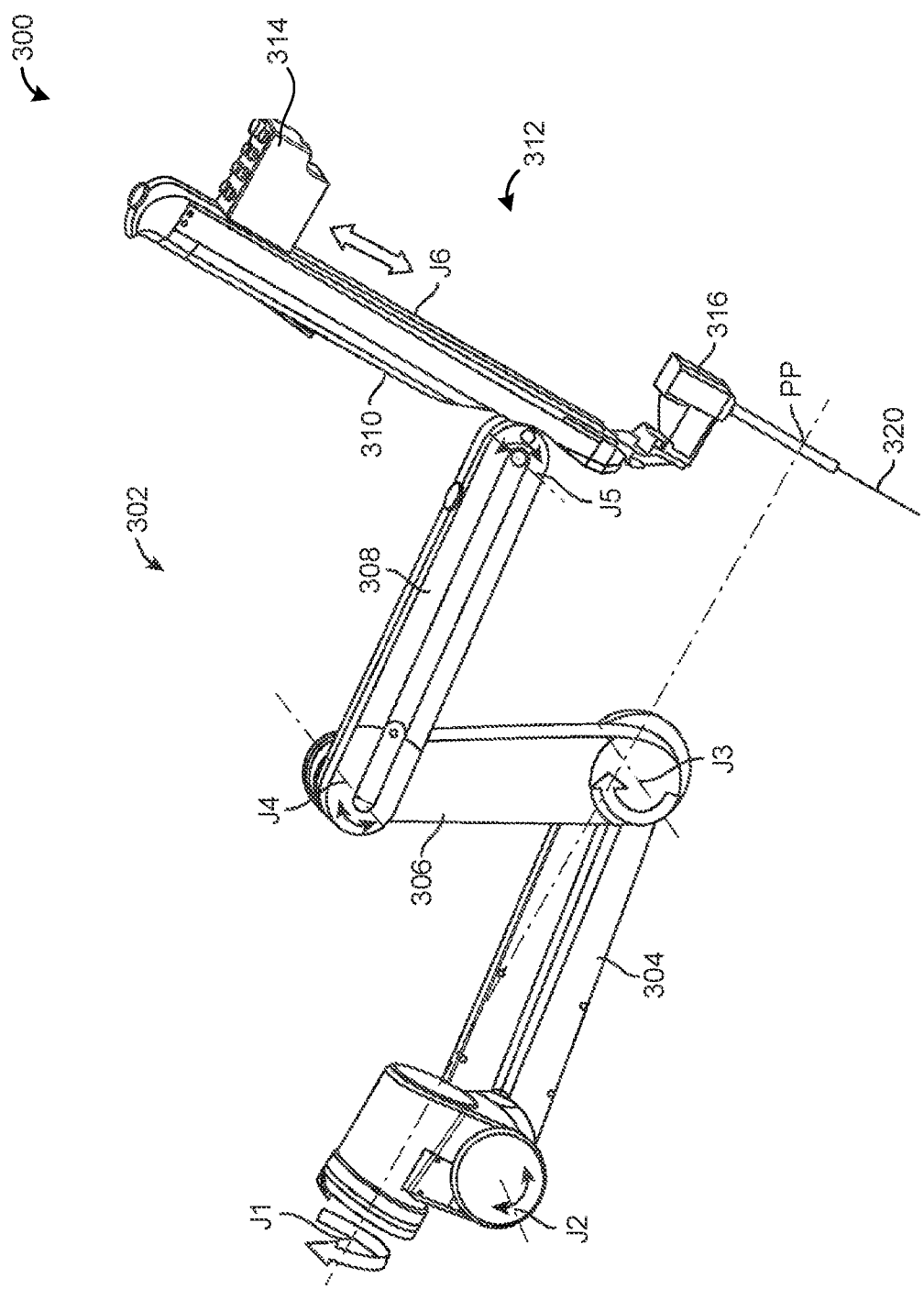
FIG. 3 shows an example of a manipulator arm assembly, in accordance with one or more embodiments.

An example of a manipulator assembly (300) in accordance with embodiments of the present disclosure is shown in FIG. 3. A manipulator assembly (300) may include a manipulator arm (302) and a tool (320) (also called instrument (320)) (in FIG. 3, only an axis of the tool, but not the tool itself, is shown). The manipulator arm (302) may correspond to the manipulator arm (250A, 250B, 250C, 250D) in FIG. 2B. As described above, during operation, the manipulator arm (302) generally supports a distal instrument or tool (320) and effects movements of the tool (320).

In minimally invasive scenarios, a tool (320) may be positioned and manipulated through incisions in the patient so that a kinematic remote center is maintained at the incision so as to minimize the size of the incision or forces applied to tissue surrounding the incision. More specifically, an elongate shaft of a tool (320) allows the end effectors and the distal end of the shaft to be inserted distally into a worksite through a lumen of the cannula often inserted through a body wall such as an abdominal wall. The worksite may be insufflated. Images of the worksite, taken by an imaging tool such as an endoscope, may include images of the distal ends of the instruments or tools (320) when the tools (320) are positioned within the field-of-view of a tool operating as an imaging device.

As a number of different tools (320) having differing end effectors may be sequentially mounted on a manipulator arm (302), or as a tool (320) needs to be removed and reinstalled during a procedure, a distal tool holder facilitates removal and replacement of the mounted instrument or tool.

As may be understood with reference to FIG. 2A, manipulator arms (302) are proximally mounted to a base of the robotic assembly. Alternatively, manipulator arms (302) may be mounted to separate bases that may be independently movable, e.g., by the manipulator arms (302) being mounted to single-manipulator-arm carts, being provided with mounting clamps that allow mounting of the manipulator arms (302) directly or indirectly to the operating table (shown in FIG. 2A) at various locations, etc. Typically, a manipulator arm (302) includes a plurality of manipulator arm segments and associated joints extending between the proximal base and the distal tool holder.

In embodiments such as shown for example in FIG. 3, a manipulator arm includes multiple joints (such as revolute joints J1, J2, J3, J4, and J5, and prismatic joint J6) and links or manipulator arm segments (304, 306, 308, and 310). The joints of the manipulator arm, in combination, may or may not have redundant degrees of freedom. A manipulator arm with one or more redundant degrees of freedom have a plurality of joints such that the plurality of joints may be driven into a range of differing configurations for a given position and orientation of a portion of the manipulator arm. For example, a manipulator arm with one or more redundant degrees of freedom may have a plurality of joints that may be driven into a range of differing configurations for a given position and orientation of a distal portion or end effector of the manipulator arm. For example, the manipulator arm (302) of FIG. 3 may be maneuvered into differing configurations while the distal member (312) supported within the tool holder (310) maintains a particular state and may include a given position or velocity of the end effector. The tool holder (310) may include a cannula (316) through which the tool shaft of the tool (320) extends, and the tool holder (310) may include a carriage ((314) shown as a box-shaped structure that translates on a spar) to which the tool attaches before extending through the cannula (316) toward the worksite.

Actuation of the degrees of freedom of the tool (320) is often provided by actuators of the manipulator. These actuators may be integrated in the carriage (314). A distal wrist of the tool may allow pivotal and/or linear motion of an end effector of the tool (320) about tool joint axes of one or more joints at the tool wrist. An angle between end effector jaw elements may be controlled independently of the end effector location and orientation.

In FIG. 3, when the tool (320) is coupled or mounted on the manipulator arm (302), the shaft extends through the cannula (316). The tool (320) typically is releasably mounted on a tool holder (310) of the manipulator arm (302), which may be driven to translate along a linear guide formed by prismatic joint (J6). This may also be referred to as the "IO", and provide in/out movement along an insertion axis.

While FIG. 2A, FIG. 2B, and FIG. 3 show various configurations of components, other configurations may be used without departing from the scope of the invention. For example, various components may be combined to create a single component. As another example, the functionality performed by a single component may be performed by two or more components. Further, while the components are often described in the context of surgical scenarios, embodiments of the disclosure are applicable to medical scenarios outside of surgery, and to other non-medical domains that involve robotic manipulation. In addition, embodiments of the disclosure may involve different types of robotic systems. For example, while the manipulator arm (302) is rigid, other embodiments may include flexible robotic devices such as steerable flexible catheters.

Figure 4A:
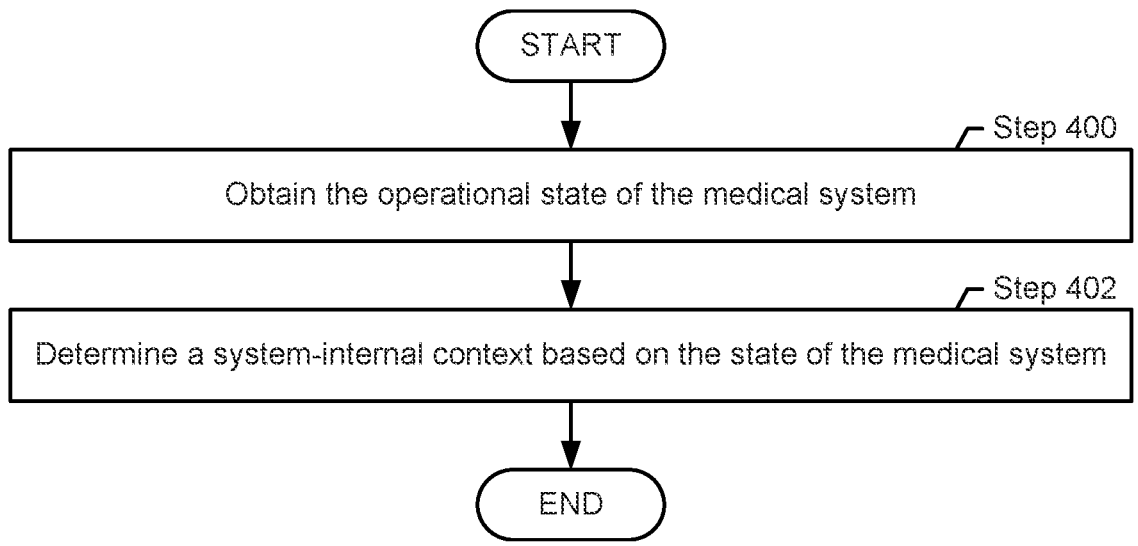
FIG. 4A shows a flowchart describing methods for obtaining a system-internal context, in accordance with one or more embodiments.
Figure 4B:
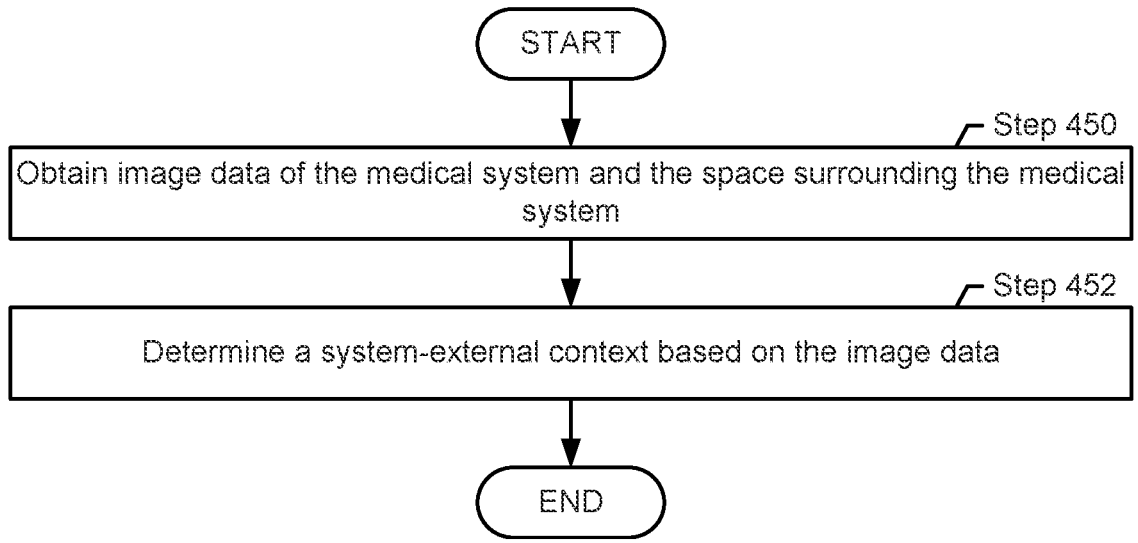
FIG. 4B shows a flowchart describing methods for obtaining a system-external context, in accordance with one or more embodiments.
Figure 5:
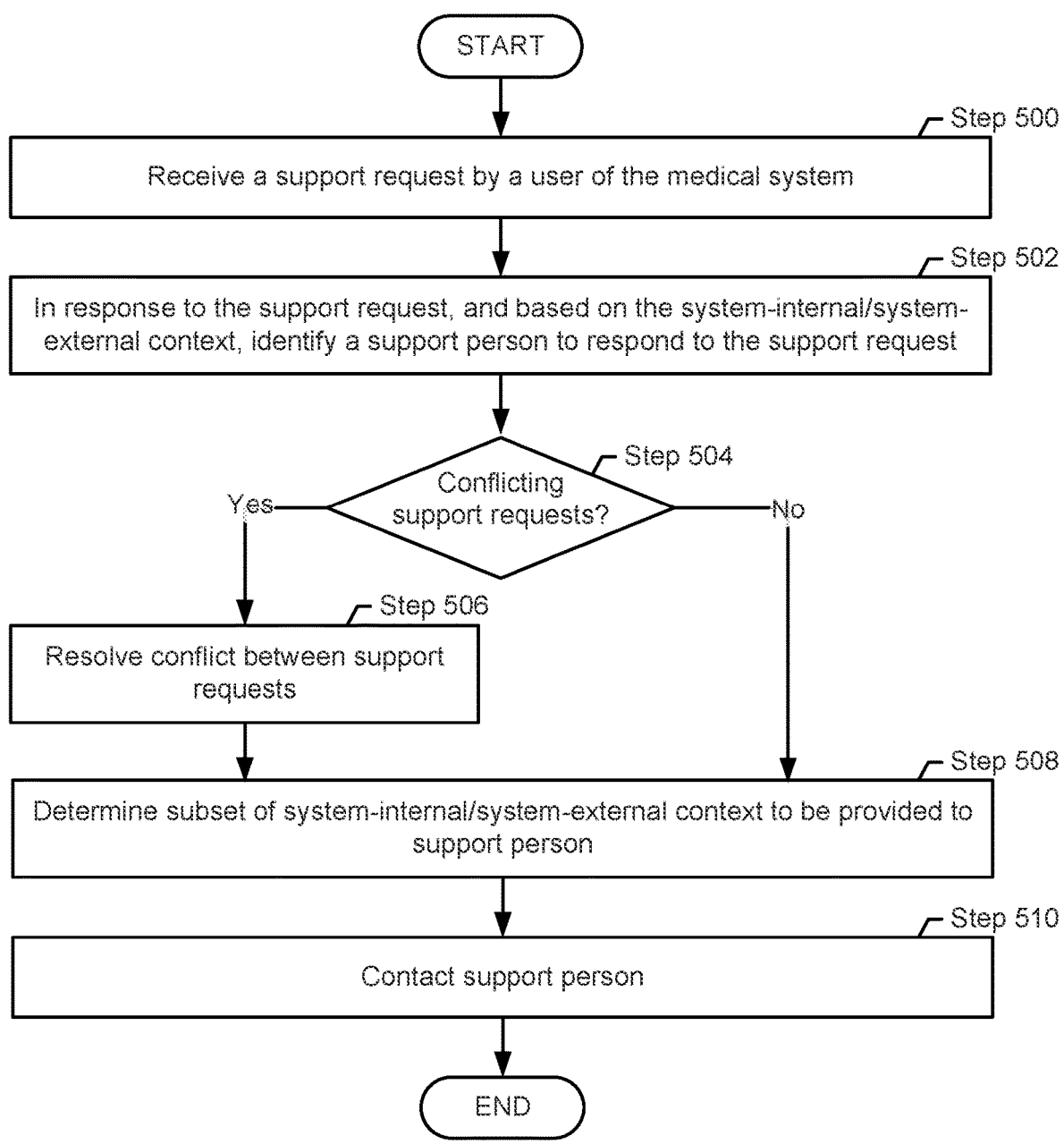
FIG. 5 shows a flowchart describing methods for providing support in response to a support request, in accordance with one or more embodiments.

Turning to the flowcharts, FIG. 4A, FIG. 4B, and FIG. 5 depict methods for coordinating user assistance, in accordance with one or more embodiments. One or more of the steps in FIG. 4A, FIG. 4B, and FIG. 5 may be performed by various components of the systems, previously described with reference to FIG. 1, FIG. 2A, FIG. 2B, and FIG. 3. Some of these figures describe particular computer-assisted medical systems. However, the subsequently described methods are not limited to a particular configuration of a medical system. Instead, the methods are applicable to any type of medical system or, more generally, any type of robotic system.

While the various steps in these flowcharts are presented and described sequentially, one of ordinary skill will appreciate that some or all of the steps may be executed in different orders, may be combined or omitted, and some or all of the steps may be executed in parallel. Additional steps may further be performed. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention. Accordingly, the scope of the disclosure should not be considered limited to the specific arrangement of steps shown in FIG. 4A, FIG. 4B, and FIG. 5.

FIG. 4A and FIG. 4B describe how a system-internal and a system-external context, respectively, is obtained in various embodiments. FIG. 5 describes how support may be obtained in response to a support request, under consideration of the system-internal and/or system-external context.

Turning to FIG. 4A, a flowchart describing methods for obtaining a system-internal context, in accordance with one or more embodiments, is shown. The method of FIG. 4A may be repeatedly executed to ensure that the system-internal context is up to date at any time.

In Step 400, the operational state of the medical system is obtained. Obtaining the operational state may include obtaining parameters from the medical system. These parameters may include any information that provides insight into the current operational state of the medical system. For example, numerous parameters of a robotic manipulation system (as described below with reference to FIG. 2A, FIG. 2B, and FIG. 3), such as a kinematic configuration of the manipulator arm(s) and/or the instrument(s), types of instruments being mounted on the manipulator arm(s), the kinematic configuration of the instruments, activated control modes, the docking state of the cannula(s), etc., may be collected. Other parameters that may be collected may include hardware serial numbers, firmware versions, installed hardware and/or software modules, errors of the medical system stored in error logs, etc.

In Step 402, the parameters gathered in Step 400 characterize aspects of a system-internal context. In one or more embodiments, the obtained parameters are further processed to derive additional system-internal context. For example:

(i) Based on a current kinematic configuration and a location of a patient (if known), it may be estimated whether the robotic manipulation system is currently in a use state, in a setup state before or after use, and/or whether elements of the robotic manipulation system are in proximity of the patient or not.

(ii) For systems using cannulas, based on whether a cannula is docked to a manipulator arm, it may be estimated whether a procedure is in progress (no cannula docked), or whether the robotic manipulation system is being set up or underway (cannula docked). When a cannula is docked, some systems may be programmed to assume that the robotic manipulation system is physically in contact and/or interacting with the patient.

(iii) Based on a mounting state (indicating whether the instrument is attached to the manipulator arm) and/or an insertion position along an insertion axis of an instrument, it may be estimated whether the instrument is extending into the patient anatomy.

(iv) Based on a current type of an instrument being used, the type and/or state of a procedure currently being performed may be estimated. For example, while a scalpel may be used during an ongoing medical procedure, a needle driver may be used toward the end of the medical procedure.

(v) Based on a current configuration of the instrument (e.g., forceps open versus closed), it may be estimated whether the instrument is currently grasping tissue or is interacting with the tissue in a different manner (vi) Based on the robotic manipulation system being or having been in teleoperation mode it may be estimated that a procedure is ongoing.

Broadly speaking, as illustrated by the examples (i)-(v), an operational state of the robotic manipulation system may be estimated based on parameters obtained from the robotic manipulation system itself. Over time, a history of states may be established, reflecting the procedure that has been/is being performed using the robotic manipulation system. Those skilled in the art will appreciate that the estimation of the system operational state is system-specific and application-specific and is not necessarily universally valid. For example, if for one medical scenario it is known that the use of a particular forceps is uniquely associated with a very specific step being performed, it may be a reasonable to predict that the specific step is being performed when the forceps is actually present. The same assumption may be not be valid for other medical scenarios. For example, in other medical scenarios, the forceps may be used in different steps or may not be used at all. The examples (i)-(v) are associated with different risks and may require a different response, in case of a support request. While not specifically discussed, other additional information may be derived by analyzing the parameters obtained from the medical system, without departing from the disclosure.

FIG. 4B shows a flowchart describing methods for obtaining a system-external context, in accordance with one or more embodiments. The method of FIG. 4B may be repeatedly executed to ensure that the system-external context is up to date at any time. The execution of the method of FIG. 4B may be independent from the execution of the method of FIG. 4A.

In Step 450, image data of the medical system and the operating environment external to the medical system (such as space surrounding or near the medical system) is obtained. The obtained image data may be a single image frame, or a series of image frames (e.g. a video).

In Step 452, a system-external context is determined, based on the image data. Digital image processing may be performed to detect elements that are present in the image frame(s). In the example of the robotic medical system of FIG. 2A, FIG. 2B, and FIG. 3, elements that may be detected include, but are not limited to, the robotic manipulation system, the operating table, the patient on the operating table, a sterile field, the presence of additional relevant components such as an anesthesia cart, the position of the robotic manipulation system relative to the operating table, etc.

The elements isolated by the image processing characterize aspects of the system-external context, and provide information about the operational context of the system that is derived from observations made outside of the system. For example:

(i) Based on a presence or absence of a patient on the operating table (e.g., a patient-location state), the state of a planned or ongoing procedure may be estimated: when no patient is present, the robotic system is not in an operation state, whereas when a patient is present, it is more likely that the robotic system is about to be used, being used, or was just used for a procedure. Additional indications of a procedure that is about to be performed, or an ongoing procedure, include the detection of a sterile field after the patient having been prepped (e.g., a patient preparation state), and/or the detection of an incision (e.g., an incision-made state).

(ii) Based on a presence of elements of the robotic system within the sterile field, it may be estimated that a procedure is ongoing, and that precautions may be necessary due to the possibility of interaction between the robotic system and the patient.

(iii) Additional system-external context may be obtained by identifying the persons that are present, such as whether a surgeon or other clinician, assistants, etc. are in the vicinity of the medical system. In addition, their level of experience (if accessible by the environment awareness engine, for example, by retrieving information about the personnel from a database) may also be considered system-external context.

Generally, the system-external context may include any information that is not directly obtainable from the robotic manipulation system itself. As illustrated by the examples (i)-(iii), an operational state of the robotic manipulation system may be estimated based on parameters that are not directly obtainable from the robotic manipulation system itself, but that are instead gathered through monitoring of the operating environment external to the robotic manipulation system. Over time, a history of states may be established, reflecting the procedure that has been/is being performed using the robotic manipulation system. The system-external context, thus, broadens the scope of the available context to be used for coordinating remote assistance. While the above examples illustrate system-external context based on image processing, other system-external context may be relied upon as an alternative or in addition. For example, sensors built into the patient table or into the anesthesia cart may provide additional system-external context.

After the execution of the methods of FIG. 4A and/or FIG. 4B, system-internal and/or system-external context is available, and support the execution of the method of FIG. 5.

Turning to FIG. 5, a flowchart describing methods for initiating support in response to a support request, in accordance with one or more embodiments, is shown. The steps of the flowchart may be executed once a support request is received from a user of a computer-assisted system. For convenience, the example below be for when the computer-assisted system, is a medical system.

In Step 500, a support request is received from a user of the medical system. The support request may be provided in various ways, and/or may include various degrees of information. The support request may be made by the user by pressing a physical button or a virtual button of a user interface. The user interface may be part of a medical system. When entered via user interface, the support request may be accompanied by additional information. For example, the user making the support request may check certain checkboxes to clarify the nature of the support request, and/or the user may enter free text to provide additional details. The support request may alternatively be made by the medical system itself, e.g., when the medical system anticipates a need for assistance. This may occur, for example, when a specific type of error is detected.

In Step 502, a support person to respond to the support request may be selected. The support person, in one or more embodiments, is identified based on, at least one of the system-internal context, the system-external context, and the support request itself.

In one or more embodiments, a set of rules is used to identify the support person. The set of rules may be selected to provide optimal support based on metrics including minimizing risk, minimizing the time required to obtain a solution, minimizing cost and/or effort, etc. As a result, the support person that is likely to be most appropriate based on the urgency, risk, and/or required expertise is selected. In other words, the selection performed in Step 502 ensures that the selected support person is sufficiently qualified.

In one or more embodiments, the set of rules includes if-then conditional statements that may be arranged in a tree-like structure. By traversing the tree using the system-internal context, the system-external context, and/or the support request itself, the support person to respond to the support request may be identified. A discussion of rules in the form of conditional statements is provided below with reference to FIGS. 6A and 6B.

The following rules are examples that may be applicable to the robotic surgical system introduced in FIG. 2A, FIG. 2B, and FIG. 3. Additional rules are illustrated in the examples shown in FIGS. 6A and 6B, below. Different rules may be used for other medical systems, without departing from the disclosure.

(i) Support request during the setup of the medical system: The setup phase may be estimated based on system-internal or system-external context. For example, it may be assumed that the medical system is in the setup phase when no patient is present, when the patient is present but no sterile field is detected, and/or when no cannula is docked. During the setup phase, a robotics coordinator may be a support person qualified to provide support for many requests for assistance. The robotics coordinator may have a sufficient understanding to resolve issues that may arise during the setup of the medical system. While the robotics coordinator would not necessarily be qualified to provide advice for scenarios that involve potential interactions between the medical system and a patient, the robotics coordinator's expertise may be sufficient during the setup phase when no patient is present.

(ii) Support request during an ongoing procedure: an ongoing procedure may be estimated based on system-internal or system-external context. For example, it may be assumed that the medical system is in an ongoing procedure when an element of the medical system extends into the sterile field, and/or when a cannula is docked. A remote technician or expert may be contacted as the support person to assist with the support request. The remote expert may have the expertise to handle potential interactions between the medical system and the patient. Similarly, a remote expert may be contacted when a procedure is likely to begin soon, for example, when an incision has been made.

(iii) Support request during an ongoing procedure as a result of a specific issue: An ongoing procedure may be estimated based on system-internal or system-external context. For example, it may be assumed that the medical system is in an ongoing procedure when an element of the medical system extends into the sterile field, and/or when a cannula is docked. Further, the specific issue may be detected based on an error flag identifying the issue and/or by the user specifying the specific issue when making the support request. Assume, for example, that a tissue stapler has faulted during an ongoing procedure. A remote expert with specific expertise (in this case a remote expert with a background in tissue stapler-related issues) may be contacted as the support person to assist with the support request.

(iv) Support request near the end or after completion of an ongoing procedure: The user issuing the support request may indicate that the ongoing procedure is nearing completion. Assume, for example, that one of multiple manipulator arms malfunctions, in absence of other complications. The user may receive the recommendation to complete the procedure with the remaining functional manipulator arms. A field technician is contacted with instructions to examine the medical system at a later time.

Broadly speaking, the remote expert may be contacted whenever an issue could result in a procedure being aborted, which may then require the performance of the procedure using alternative techniques. For other issues, field technicians or robotics coordinators may be contacted.

While some of the described estimations may be performed based on a system-internal or a system-external context, estimations may benefit from the availability of both system-internal and system-external context. The availability of both system-internal and system-external context may better inform the selection of the support person in various scenarios. Consider, for example, a scenario in which the system-internal context indicates that the robotic arm(s) of a robotic surgical system is/are draped. Further, in the scenario, the system-external content indicates that the patient is on the table, the patient is sedated, and a first incision has been made to place a port for insertion of a cannula. Viewed in isolation, the system-internal state does not provide sufficient information to select a support person. For example, an urgent situation may arise if the draped robotic arms are supposed to be used in a surgical procedure scheduled to begin soon. In contrast, a non-urgent situation may arise if the robotic arms are draped for a procedure scheduled for the next day, or if the robotic arms are still draped after completion of a procedure.

Similarly, viewed in isolation, the system-external context also does not provide sufficient information to select a support person. For example, based on the mere presence of a patient with an incision, it is not clear whether the robotic surgical system is to be used to perform a procedure on the patient. However, the combination of system-internal and system-external context may provide the insight that the robotic surgical system is to be used on the patient, and that the procedure is scheduled to begin soon. This more complete picture may be derived through consideration of temporal aspects of the system-internal and/or system-external context. Specifically, in this scenario, the robotic surgical system in its current configuration was not previously involved in a procedure (performed on another patient). Accordingly, based on the system's history over time, the assumption is that the robotic arms are draped to perform a procedure on the patient. Further, based on the detection of an incision, it is clear that the procedure is imminent. Accordingly, the received support request requires immediate attention and needs to be handled by a support person with the capabilities to spontaneously address the issue underlying the support request, with a minimum delay.

A procedure may be segmented into stages such as an "ongoing procedure" which would be considered high priority, and "prior to ongoing procedure" which would be considered lower priority. In addition, when interpreting the combination of system-internal and system-external context, considered, sub-stages may be considered. For example, in the previously described scenario, a sub-stage for the "prior to ongoing procedure" is introduced. The sub-stage is immediately prior to the ongoing procedure. Even though the sub-stage is part of the "prior to ongoing procedure" stage, a high priority is assigned, as previously described.

A similar distinction may be made in another scenario in which the system-internal context indicates that the docking has started but has not been completed, and in which the system-external context indicates that a cannula has already been placed. In this scenario, the system-internal context and the system-external context are otherwise as described in the previous scenario. Because the docking has not yet been completed, merely considering the system-internal context would result in the conclusion that the robotic surgical system is in the "prior to ongoing procedure" stage. However, based on the cannula having been placed, a sub-stage is introduced to require a support person with expertise in in-procedure issues.

The described scenarios illustrate that using the combination of system-internal and system-external context, stages and sub-stages of a procedure can be identified at a finer granularity to ensure that the appropriate support person is contacted. Frequently, the identification of sub-stages relies on temporal aspects which may be obtained by acquiring system-internal and/or system-external context over time. The context obtained over time may establish a history of the state(s) of the medical system and/or the operating environment surrounding the medical system.

The combination of system-internal and system-external context may further provide convergent information, even in absence of a temporal component. Consider, for example, a scenario in which the system-internal context indicates that the robotic arm(s) of the robotic surgical system is/are draped. Further, assume that the system-external context, based on image data, indicates that the drapes are ripped. Accordingly, prior to a procedure to be performed, a support person, e.g., a technician, may be asked to replace the damaged drapes.

In another scenario, assume that the system-external context, based on image data, indicates that instruments are currently inserted into the patient. In addition, the system-internal context identifies instruments that are being held by the arms of the robotic surgical system. In view of the system-internal and system-external context in combination, an estimate of which instruments are the ones that are likely inserted may be generated.

In Step 504, a test is performed to determine whether the support request conflicts with other support requests. Because the support agent may receive support requests from different users operating different medical systems, a support request may conflict with another support request whenever the same support person is identified for both support requests. When a conflict is detected, the execution of the method may proceed with Step 506. If no conflict is detected, the execution of the method may directly proceed with Step 508.

In Step 506, the conflict between the conflicting support requests is resolved. In one or more embodiments, priorities are determined for the conflicting requests. Generally speaking, a higher priority is assigned to a request involving a higher urgency scenario in comparison to a lower urgency scenario. For example, for cannula-using systems, when a cannula is docked to a manipulator arm, the urgency may be higher because a procedure is more likely to be ongoing, whereas when the medical system is being set up, with no cannula being docked, the urgency may be lower because a procedure is less likely to be currently ongoing. Similarly, an urgency may be higher when an instrument is currently interacting with tissue (e.g., forceps grasping a blood vessel), in comparison to an instrument being in a retracted position. As these examples illustrate, the urgency may be assessed based on the type of operation that is currently being performed, a state or stage of the operation being performed, and/or some other appropriate context. Accordingly, conflicts may be resolved by evaluating one or more conditional statements that determine the priority for each of the conflicting requests based on the type of operation, the state or stage of the operation being performed, etc. The conflicting requests may then be ordered, delayed, reassigned, or otherwise handled according to their associate priority. In the example shown in FIG. 5, the higher priority request may be immediately processed by execution of Step 508. The lower priority request may be put on hold for later execution. As another example, the higher priority request may be reassigned to a different support person who likely has more experience than required to resolve the issue, or the lower priority request may be reassigned to a different support person. Broadly speaking, a relative priority of the competing requests is used to resolve the conflicting requests.

In Step 508, a subset of the system-internal and/or system-external context, to be provided to the support person, is identified. In one embodiment, context that may be relevant to an issue that triggered the support request are identified for provision to the support person, whereas another context are not identified for provision to the support person. Consider, for example, a support request indicating that the user is experiencing a problem with a tissue stapler. In this scenario, error or other status flags and historical use information associated with the control of the tissue stapler or component of the medical system supporting the tissue stapler, are identified for provision. In contrast, image data showing the medical system and the operating environment external to the medical system is not identified for provision. Information that is assumed to help the support person is thus compiled or synthesized. Additional optimizations may further be performed when transmitting the system-internal and/or system-external data. For example, in some scenarios data positioning the medical system in its present configuration, and including the operating environment, is transmitted. The data may be sent as point cloud as obtained from a three-dimensional camera image, which would require more bandwidth.

Where a portion of the data concerns devices with known models, that portion of data may alternatively be sent as an object IDs and key information for modeling the device (e.g. a present kinematic configuration (joint positions, instrument types installed, etc. for a manipulating system) may instead be sent. The object IDs may identify elements of the medical system, and the kinematic configuration may indicate the position and orientation of the key elements of the manipulating system, thereby enabling reconstruction of a three-dimensional representation of the medical system on a computing device of the support person. This latter approach may generally require less bandwidth for providing information to the support person. Also, when a patient is present, image data of the patient may be redacted or simplified; this can save transmission bandwidth, and also help ensure patient privacy. For example, the patient may be replaced by a generic body representation, the patient's face may be occluded, etc.

In Step 510, contact of the support person is facilitated. When contacting the support person, the subset of the system-internal and/or system-external context may be provided to the support person being contacted. Various communication media may be used to contact the support person. For example, a phone call or a video call may be initiated, a chat session may be started, etc. The contacting of the support person may be performed by the previously described support agent, or alternatively by another component or system. The support agent may facilitate the contacting of the support person, and may further facilitate the providing of the subset of the system-internal and/or system-external context to the support person being contacted.

In various embodiments, the system for coordinating user assistance is updated based on feedback or other input, in accordance with one or more embodiments, is shown. For example, in some embodiments, after the support request has been handled, feedback may be obtained directly from the user or support person, or indirectly from parameters that indicate the successfulness of the support (e.g. length of call, what data accessed, what advice rendered, etc.). This feedback may be used to assess whether the provided support successfully addressed an underlying issue. Further, feedback may be obtained on the efficiency level of the provided support. In some embodiments, this feedback is used to update the support person identification logic and/or the conflict resolution logic. Additional updates may be made to accommodate new medical systems, features, procedures, etc. The updates may be manually performed, for example by an administrator revising a decision tree consisting of if-then conditional statements. Alternatively, if classifier-type machine learning algorithms are used to perform the support person identification, these machine learning algorithms may be updated in a supervised manner based on historical data. The historical data may be obtained from previous, documented support calls.

Figure 6A:
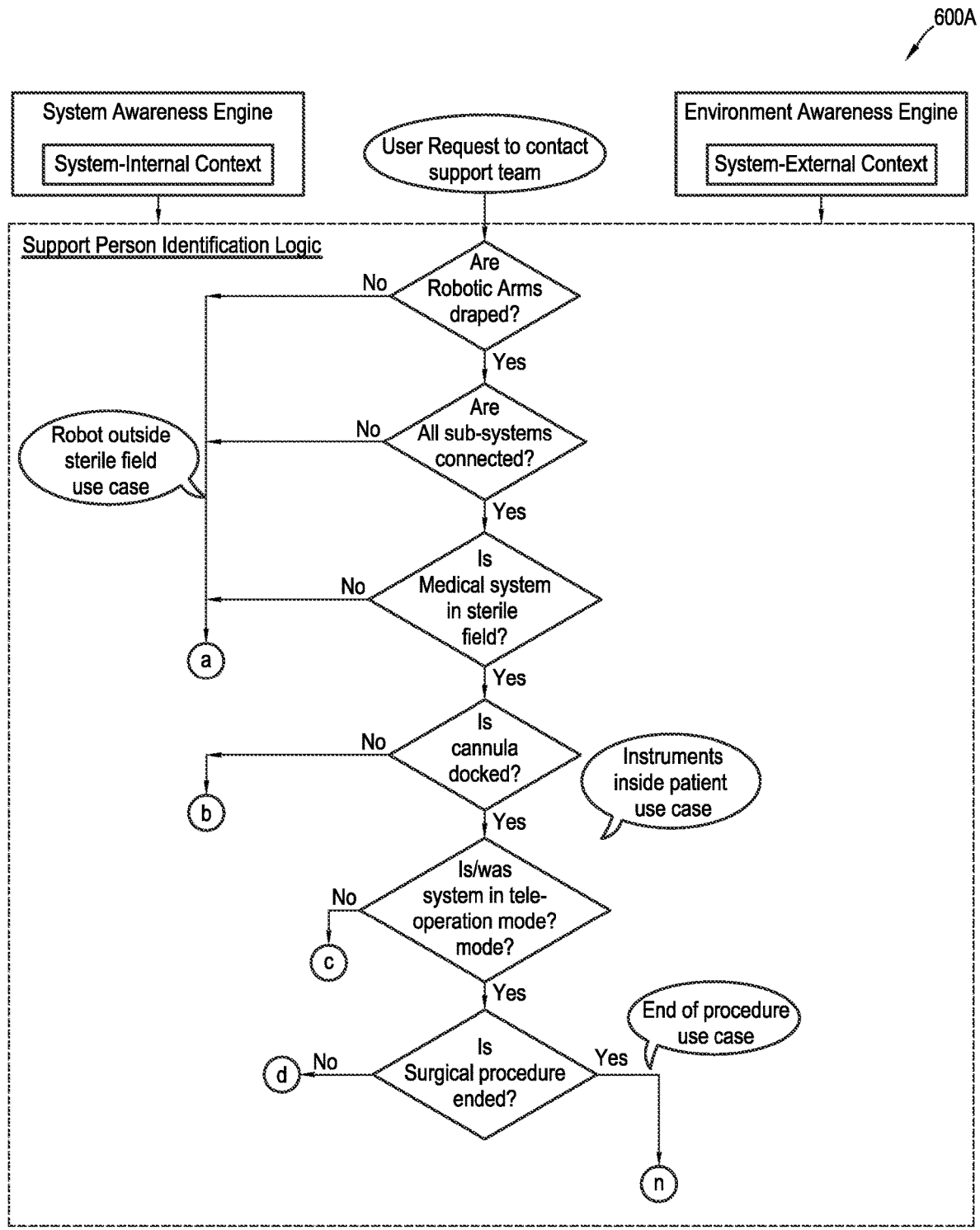
FIG. 6A and FIG. 6B show an example of a set of rules for identifying an appropriate support person, in accordance with one or more embodiments.
Figure 6B:
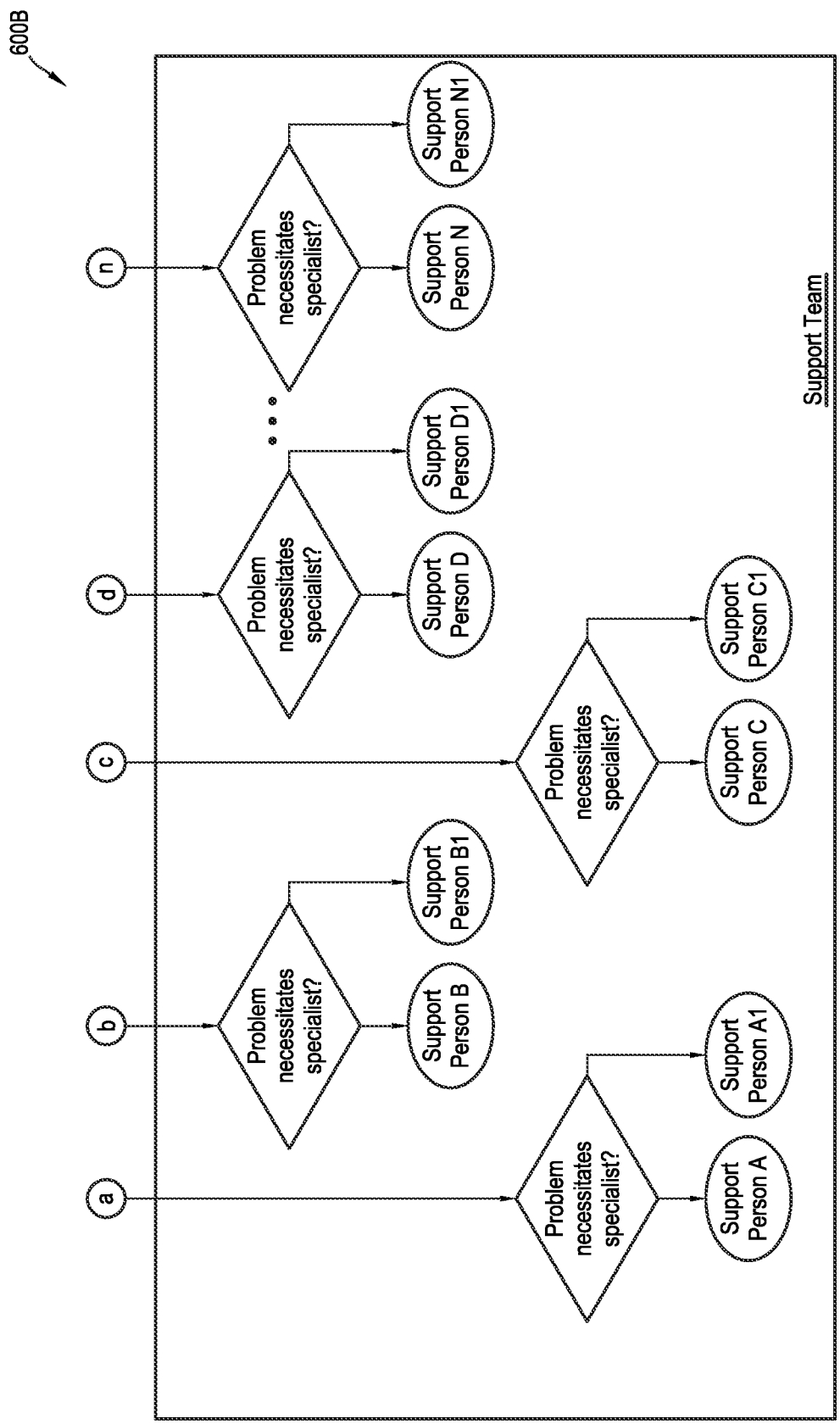

Turning to FIGS. 6A and 6B an example of a set of rules for identifying an appropriate support person, in accordance with one or more embodiments, is shown. In the example (600A, 600B), a series of conditional statements are used to implement the support person identification logic. The conditional statements are designed to ensure that a support person, qualified to address the support request, is identified. In the example, conditional statements are arranged in series in an order that substantially reflects the workflow of a procedure being performed with the medical system. Support persons are then identified based on a familiarity level of the support person with the medical system, the step currently being performed with the medical system, the components and/or other aspects currently involved, etc.

In the example, the first test verifies whether the medical system is draped. Draping may be detected as system-internal context from by sensors in the medical system for detecting the attachment of draping components to the system, or as system-external context by sensors that detect drapes near the medical system (e.g. a camera may detect whether the draping is present on any manipulator arms of the medical system). If the system has not yet been draped is not present, but the system otherwise has data that it is soon to be used (e.g. through scheduling information, previous user data entry to the system, etc.) the medical system may be determined to be in the process of being set up. At this stage, no patient is present, and no medical procedure is about to be begin. Accordingly, support person A, which may be a technician trained to handle problems of the medical system while no medical procedure is ongoing, is selected.

The second test verifies whether all sub-systems of the medical system are connected. This may include a verification of network connections between various components of the medical system to ensure that they can properly communicate. Support person A may be selected when not all subsystems are found to be connected. Support person A may be able to establish the connections.

The third test verifies whether the medical system is in the sterile field. The presence of, for example, the medical system requires different considerations for various reasons: It may be essential that sterility is maintained within the sterile field. In addition, when the medical system is in the sterile field, it is likely that a procedure is about to begin. The patient is sedated, and even an incision may have already been made. Accordingly, it is typically desirable to find a solution to the problem, allowing the procedure to be performed rather than aborted. Support person A may be selected when the medical system is not present in the sterile field.

An additional test may be performed to determine whether the problem necessitates a specialist rather than a generalist, after the completion of the first, second, and/or third test. For example, a problem associated with a particular instrument may require a specialized knowledge of the instrument or another component of the medical system. If a specialist is required, support person A1 may be selected, instead of support person A.

The fourth test verifies whether a cannula is docked to a manipulator arm of the medical system. When the cannula is docked, the procedure is considered to be in progress. Similarly, when an incision has been made, or an instrument may have been inserted through the cannula, the procedure is considered to be in progress. Support person B may be selected when the cannula is not yet docked. In comparison to support person A, support person B would need to be familiar with procedures that involve the presence of the patient, and a component of the medical system being in the sterile field. By selecting a more knowledgeable support person B over support person A, the likeliness of successfully addressing the underlying problem should increase, to avoid having to abort the scheduled procedure. An additional test may be performed to determine whether the problem necessitates a specialist rather than a generalist. If a specialist is required, support person B1 may be selected, instead of support person B.

The fifth test verifies whether an instrument supported by the medical system is or has recently been locally manipulated or teleoperated. Such use or such teleoperation is, in various embodiments, an indication that the procedure is ongoing. Prior to teleoperation, the procedure is not yet ongoing, but an instrument may have been inserted into the patient body. Accordingly, if no teleoperation is detected, a support person C may be selected. Support person C may be trained to deal with scenarios that involve instruments that are inserted into the patient. An additional test may be performed to determine whether the problem necessitates a specialist rather than a generalist. If a specialist is required, support person C1 may be selected, instead of support person C.

The sixth test verifies whether the procedure has ended. This may be determined, for example, based on all cannulas having been undocked, the medical system having been removed from the sterile field, etc. Support person D may be selected when the procedure is still ongoing. Support person D may have training to be able to assist mid-procedure. Accordingly, unlike support persons A, B, and C which are qualified based on their familiarity level with the medical system, support person D is selected based on a familiarity level with the procedure being performed. In addition, support person D is typically also familiar with the medical system. An additional test may be performed to determine whether the problem necessitates a specialist rather than a generalist. If a specialist is required, support person D1 may be selected, instead of support person D. Support person N may be selected when the procedure has ended. Support person N may have a general background to assess the reported problem. The problem may then be addressed at a later time. An additional test may be performed to determine whether the problem necessitates a specialist rather than a generalist. If a specialist is required, support person N1 may be selected, instead of support person N.

Those skilled in the art will appreciate that the configuration of the support person identification logic depends on many factors. Accordingly, the disclosure is not limited to the example shown in FIGS. 6A and 6B.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A medical system comprising:
  a robotic manipulation system comprising a manipulator arm configured to support an instrument on the manipulator arm, the manipulator arm comprising a plurality of joints that enable control of a kinematic configuration of the manipulator arm,
    wherein the robotic manipulation system is configured to perform a medical procedure on a patient; and
  a coordination system for coordinating remote assistance for the robotic manipulation system while the medical system is in an operational state that is one of:
    a use state of the robotic manipulation system,
    a setup state before the use state, and
    a setup state after the use state,
  the coordination system comprising:
    a system awareness engine executed by a processing system of the medical system and configured to:
      obtain parameter data from sensors of the robotic manipulation system, the parameter data comprising a plurality of positions or velocities of the plurality of joints,
      process the parameter data to determine a system-internal context of the medical system, the processing comprising:
        determining a current kinematic configuration of the manipulator arm based on the plurality of positions or velocities, computing, based on the current kinematic configuration and a location of the patient, a proximity of the robotic manipulation system to the patient, and determining an estimate of the operational state of the medical system based on the proximity; and a support agent executed by the processing system and configured to:

receive a first support request from the medical system, receive the system-internal context from the system awareness engine, evaluate the system-internal context to identify a support person to respond to the first support request from a plurality of support persons, the evaluation comprising:

identifying, by a support person identification logic, the support person to respond to the first support request according to the estimate of the operational state wherein the support person identification logic is configured to assign each support person of the plurality of support persons to at least one of the use state, the setup state before the use state, and the setup state after the use state, and automatically contact the support person to respond to the first support request.

2. The medical system of claim 1,
wherein the first support request is for technical support of the medical system, and
wherein the support person is a technical support person for the medical system.

3. The medical system of claim 1, wherein the support agent is further configured to:
prior to automatically contacting the support person, identify a subset of the system-internal context to be provided to the support person, and
after automatically contacting the support person, facilitate provision of the subset of the system-internal context to the support person.

4. The medical system of claim 1, wherein the system-internal context comprises a mounting state of the instrument, or a type of instrument being used, or a docking state of a cannula.

5. The medical system of claim 1,
wherein the system awareness engine is configured to:
obtain operational information of the medical system, and
determine the system-internal context based on the operational information.

6. The medical system of claim 1,
wherein the support agent is further configured to identify the support person by applying the support person identification logic further to a system-external context, and
wherein the system-external context is obtained from an environment awareness engine configured to detect information about an operating environment external to the medical system.

7. The medical system of claim 1, wherein the support person identification logic comprises a plurality of rules arranged to qualify support persons based on at least one factor selected from the group consisting of: a stage of a procedure being performed with the medical system, a familiarity level with the medical system, a familiarity level with a procedure being performed with the medical system, and specialized knowledge of an aspect of the medical system.

8. The medical system of claim 7, wherein the plurality of rules is further arranged to deduce convergent information from a combination of the system-internal context and a system-external context.

9. The medical system of claim 1, wherein the support agent is further configured to:
receive a second support request;
determine that a conflict exists between the second support request and the first support request in simultaneously requiring the support person;
resolve, using conflict resolution logic, the conflict by:
identifying a relative priority between the first and second support requests; and
based on the relative priority, delaying, or reassigning at least one request of the first and second support requests.

10. The medical system of claim 9, wherein the conflict resolution logic identifies the relative priority based on at least one factor selected from the group consisting of: a type of an operation being performed by the medical system, a state of an operation being performed by the medical system, and a stage of an operation being performed by the medical system.

11. The medical system of claim 1,
wherein the robotic manipulation system comprises:
a draping attachment sensor configured to determine whether the manipulator arm is covered by a drape, and
wherein to obtain the parameter data from the sensors of the robotic manipulation system, the system awareness engine is further configured to receive a signal from the draping attachment sensor, the signal indicating that the manipulator arm is draped,
wherein to identify the support person, the support person identification logic is configured to determine, based on the signal indicating that the manipulator arm is draped, a stage of the medical procedure and identify the support person according to the stage.

12. A method for operating a medical system comprising a robotic manipulation system comprising a manipulator arm configured to support an instrument on the manipulator arm, the manipulator arm comprising a plurality of joints that enable control of a kinematic configuration of the manipulator arm, wherein the robotic manipulation system is configured to perform a medical procedure on a patient, the method comprising, while the medical system is in an operational state that is one of:
a use state of the robotic manipulation system,
a setup state before the use state, and
a setup state after the use state:
obtaining, by a system awareness engine, parameter data from sensors of the robotic manipulation system, the parameter data comprising a plurality of positions or velocities of the plurality of joints;
processing, by the system awareness engine, the parameter data to determine a system-internal context of the medical system, the processing comprising:
determining a current kinematic configuration of the manipulator arm based on the plurality of positions or velocities,
computing, based on the current kinematic configuration and a location of the patient, a proximity of the robotic manipulation system to the patient, and determining an estimate of the operational state of the medical system based on the proximity; and receiving, by a support agent, a first support request from the medical system;

receiving, by the support agent, the system-internal context from the system awareness engine, evaluating, by the support agent, the system-internal context to identify a support person to respond to the first support request from a plurality of support persons, the evaluation comprising:

identifying, by a support person identification logic, the support person to respond to the first support request according to the estimate of the operational state, wherein the support person identification logic is configured to assign each support person of the plurality of support persons to at least one of the use state, the setup state before the use state, and the setup state after the use state; and automatically contacting the support person to respond to the first support request.

13. The method of claim 12, further comprising:
prior to automatically contacting the support person, identifying a subset of the system-internal context to be provided to the support person, and
after automatically contacting the support person, facilitating provision of the subset of the system-internal context to the support person.

14. The method of claim 12, wherein the system-internal context comprises at least one of:
a mounting state of an instrument of the medical system; and
a type of instrument coupled to the medical system.

15. The method of claim 12, further comprising:
obtaining, by the support agent, a system-external context from an environment awareness engine configured to detect information about an operating environment external to the medical system; and
identifying the support person by applying the support person identification logic further to the system-external context.

16. The method of claim 12, further comprising:
receiving, by the support agent, a second support request;
determining that a conflict exists between the second support request and the first support request in simultaneously requiring the support person;
resolving, using conflict resolution logic, the conflict by:
identifying a relative priority between the first and second support requests; and
based on the relative priority, delaying, or reassigning at least one request of the first and second support requests.

17. A non-transitory machine-readable medium comprising a plurality of machine-readable instructions executed by one or more processors associated with a medical system comprising a robotic manipulation system comprising a manipulator arm configured to support an instrument on the manipulator arm, the manipulator arm comprising a plurality of joints that enable control of a kinematic configuration of the manipulator arm, wherein the robotic manipulation system is configured to perform a medical procedure on a patient, the plurality of machine-readable instructions causing the one or more processors to perform a method comprising, while the medical system is in an operational state that is one of:
a use state of the robotic manipulation system,
a setup state before the use state, and
a setup state after the use state:
obtaining, by a system awareness engine, parameter data from sensors of the robotic manipulation system, the parameter data comprising a plurality of positions or velocities of the plurality of joints;
processing, by the system awareness engine, the parameter data to determine a system-internal context of the medical system, the processing comprising:
determining a current kinematic configuration of the manipulator arm based on the plurality of positions or velocities,
computing, based on the current kinematic configuration and a location of the patient, a proximity of the robotic manipulation system to the patient, and
determining an estimate of the operational state of the medical system based on the proximity; and receiving, by a support agent, a first support request from the medical system;

receiving, by the support agent, the system-internal context from the system awareness engine, evaluating, by the support agent, the system-internal context to identify a support person to respond to the first support request from a plurality of support persons, the evaluation comprising:

identifying, by a support person identification logic, the support person to respond to the first support request according to the estimate of the operational state, wherein the support person identification logic is configured to assign each support person of the plurality of support persons to at least one of the use state, the setup state before the use state, and the setup state after the use state; and automatically contacting the support person to respond to the first support request.

18. The non-transitory machine-readable medium of claim 17, wherein the method further comprises:
prior to automatically contacting the support person, identifying a subset of the system-internal context to be provided to the support person, and
after automatically contacting the support person, facilitating provision of the subset of the system-internal context to the support person.

19. The non-transitory machine-readable medium of claim 17, wherein the method further comprises:
receiving, by the support agent, a second support request;
determining that a conflict exists between the second support request and the first support request in simultaneously requiring the support person;
resolving, using conflict resolution logic, the conflict by:
identifying a relative priority between the first and second support requests; and
based on the relative priority, delaying, or reassigning at least one request of the first and second support requests.

* * * * *